(12) United States Patent
Satou et al.

(10) Patent No.: US 12,444,629 B2
(45) Date of Patent: Oct. 14, 2025

(54) SUBSTRATE INSPECTION DEVICE

(71) Applicant: Hitachi High-Tech Corporation, Tokyo (JP)

(72) Inventors: Yoshihiro Satou, Tokyo (JP); Toshio Masuda, Tokyo (JP); Akio Yazaki, Tokyo (JP); Kenshiro Ohtsubo, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 275 days.

(21) Appl. No.: 17/783,202

(22) PCT Filed: Dec. 24, 2019

(86) PCT No.: PCT/JP2019/050696
§ 371 (c)(1),
(2) Date: Jun. 7, 2022

(87) PCT Pub. No.: WO2021/130870
PCT Pub. Date: Jul. 1, 2021

(65) Prior Publication Data
US 2023/0017599 A1    Jan. 19, 2023

(51) Int. Cl.
*H01L 21/67* (2006.01)
*G01N 21/95* (2006.01)

(52) U.S. Cl.
CPC ... *H01L 21/67288* (2013.01); *G01N 21/9501* (2013.01)

(58) Field of Classification Search
CPC ......... H01L 21/67288; H01L 21/68728; H01L 22/00; G01N 21/9501

(Continued)

(56) References Cited

U.S. PATENT DOCUMENTS

2001/0013684 A1  8/2001  Smedt et al.
2009/0187354 A1  7/2009  Ooyama et al.

FOREIGN PATENT DOCUMENTS

JP    2002277502 A  *  9/2002  ......... G01N 21/8806
JP    2004171651 A  *  6/2004
(Continued)

OTHER PUBLICATIONS

International Search Report (PCT/ISA/210) issued in PCT Application No. PCT/JP2019/050696 dated Jan. 28, 2020 with English translation (four (4) pages).

(Continued)

*Primary Examiner* — Md M Rahman
(74) *Attorney, Agent, or Firm* — Crowell & Moring LLP (57) ABSTRACT

The purpose of the present invention is to provide a substrate inspection device that increases the flatness of a substrate during inspection, and improves the detection sensitivity of foreign matter. Therefore, the present invention is a substrate inspection device provided with a turntable on which a substrate to be inspected is mounted, and a clamp mechanism that holds the substrate on the turntable. The substrate inspection device is characterized in that the clamp mechanism has an abutting part that moves in an in-plane direction of the substrate and presses the substrate. Preferably, the abutting part contacts or separates from an outer peripheral side surface of the substrate by rotating centered on a rotational axis in an out-of-plane direction of the substrate.

6 Claims, 8 Drawing Sheets

(58) Field of Classification Search
USPC ........................................................ 356/237.4
See application file for complete search history.

(56) References Cited

FOREIGN PATENT DOCUMENTS

| | | | | | |
|---|---|---|---|---|---|
| JP | 2004253756 | A | * | 9/2004 | |
| JP | 2006-324692 | A | | 11/2006 | |
| JP | 2010-175551 | A | | 8/2010 | |
| JP | 2016-92025 | A | | 5/2016 | |
| JP | 2017198959 | A | * | 11/2017 | ............. G01N 21/84 |
| TW | 201037802 | A | * | 10/2010 | ............. B29C 43/18 |

OTHER PUBLICATIONS

Japanese-language Written Opinion (PCT/ISA/237) issued in PCT Application No. PCT/JP2019/050696 dated Jan. 28, 2020 (four (4) pages).

* cited by examiner

ANGLE θ BETWEEN ROTATION DIRECTION AND AIR OUTFLOW DIRECTION

SUBSTRATE INSPECTION DEVICE

TECHNICAL FIELD

The present invention relates to a substrate inspection device.

BACKGROUND ART

In a semiconductor manufacturing process, the presence of a foreign matter on a substrate such as a semiconductor wafer causes a defect such as an insulation defect or a short circuit of wiring. These foreign matters are mixed in various forms such as those generated from a movable portion such as a conveyance device, those generated from a human body, those generated by reaction in a processing device by a process gas, and those mixed in chemicals and materials. The same applies to a manufacturing process of a magnetic disk or a liquid crystal display element, and adhesion of generated foreign matter to a substrate (magnetic disk or liquid crystal display element) causes a defect.

Therefore, in these manufacturing processes, by detecting foreign matters on the substrate surface using the substrate inspection device, the dust generation status of each manufacturing device, the cleanliness of each process, and the like are monitored and controlled to improve the quality of the product, the yield, and the like. In a foreign matter inspection method, a substrate surface is irradiated with light such as laser light, and scattered light from a foreign matter is detected to inspect a size, an adhesion position, and the like of the foreign matter. Therefore, if there is undulation or the like on the substrate surface at the time of inspection, the angle of the scattered light varies, the inspection sensitivity is affected, and the reliability of the foreign matter information is lowered.

Therefore, PTL1 is known as a technique for enhancing the flatness of the substrate at the time of inspection. PTL 1 discloses a wafer inspection device including a mechanism that holds an outer peripheral end of a wafer with a vertically rotating pressing portion, and a mechanism that corrects self-weight sinking of the wafer by blowing air from a center of a turntable to a back surface of the wafer and discharging the air to a lower side of the outer peripheral portion.

CITATION LIST

Patent Literature

PTL 1: U.S. Patent Application Publication No. 2001/0013684

SUMMARY OF INVENTION

Technical Problem

In PTL 1, when a wafer having a prescribed size is held, a wafer abutting surface of a pressing portion is parallel to an outer peripheral side surface of the wafer, but when a wafer radius is different from a specified value, an angle is generated in the wafer abutting surface of the pressing portion due to vertical rotation of the pressing portion. For example, in a case where the wafer radius is larger than a specified value, since the wafer abutting surface is inclined to face upward, a force promoting deformation of the wafer is applied by the pressing portion. In addition, in a case where the wafer radius is smaller than the specified value, the wafer abutting surface is inclined to face downward, and thus, similarly, a force promoting deformation of the wafer is applied by the pressing portion.

An object of the present invention is to provide a substrate inspection device that increases flatness of a substrate at the time of inspection and improves detection sensitivity for a foreign matter.

Solution to Problem

In order to solve the above problems, the present invention provides a substrate inspection device including: a turntable on which a substrate to be inspected is mounted; and a clamp mechanism that holds the substrate on the turntable, in which the clamp mechanism includes an abutting part that moves in an in-plane direction of the substrate and that presses the substrate.

Advantageous Effects of Invention

According to the present invention, it is possible to provide a substrate inspection device that increases flatness of a substrate at the time of inspection and improves detection sensitivity for a foreign matter.

DESCRIPTION OF EMBODIMENTS

As an example of the substrate inspection device, a wafer inspection device that inspects a semiconductor wafer will be described. In addition, a direction along the wafer surface is referred to as an in-plane direction or a horizontal direction, and a direction perpendicular to the wafer surface is referred to as an out-of-plane direction or a vertical direction. The substrate to be inspected is not limited to a semiconductor wafer, and may be a magnetic disk or a liquid crystal display element.

First Embodiment

Figure 1:
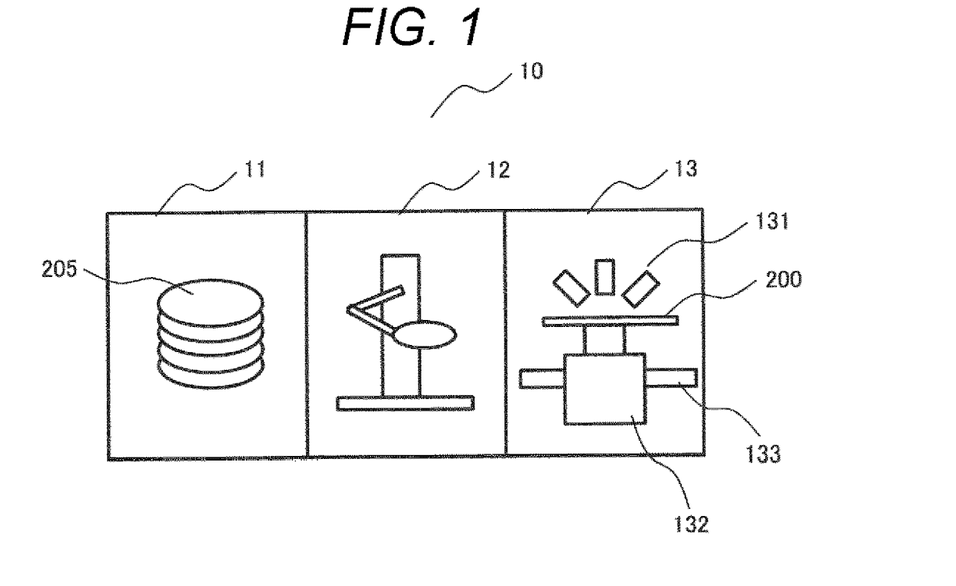
FIG. 1 is a schematic diagram illustrating a system of a wafer inspection device.

A first embodiment of the present invention will be described with reference to FIGS. 1 to 9. FIG. 1 is a schematic diagram illustrating a system of a wafer inspection device 10. As illustrated in FIG. 1, the wafer inspection device 10 mainly includes a wafer introduction portion 11 for introducing a wafer 205 from the outside, a wafer conveyance mechanism 12 for conveying the wafer 205, an inspection chamber 13, and a control unit (not illustrated). Note that the wafer inspection device 10 is installed in a space where cleanliness is maintained so as not to cause a foreign matter to adhere to the wafer 205.

In the inspection chamber 13, an optical measurement portion 131 for optically measuring the foreign matter of the wafer 205, a turntable 200 for measuring the position and size of the foreign matter while mounting and rotationally moving the wafer 205, a motor 132 for rotationally supporting the turntable 200, and a linear moving unit 133 for moving the motor 132 are arranged.

Next, an operation outline of the wafer inspection device 10 will be described. The wafer 205 is loaded into the wafer introduction portion 11 in a state of being stored in a cassette (not illustrated). Thereafter, the wafer 205 is taken out from the cassette and moved to the inspection chamber 13 by the wafer conveyance mechanism 12. The wafer 205 moved to the inspection chamber 13 is attached and held on the turntable 200.

Then, the turntable 200 holding the wafer 205 is rotationally driven by the motor 132 in order to measure the foreign matter on the wafer 205 by the optical measurement portion 131 whose position is fixed, and moves in a direction perpendicular to a rotational axis of the motor 132 by the linear moving unit 133. With such movement, the size, position, and the like of the foreign matter on the entire surface of the wafer 205 are mapped by the control unit, and recorded as foreign matter data of the wafer 205. The wafer 205 for which the measurement has been completed is released from the holding, transferred from the turntable 200 again by the wafer conveyance mechanism 12, and returned to the wafer introduction portion 11. This is repeated to inspect all the wafers in the cassette for foreign matters.

Figure 2:
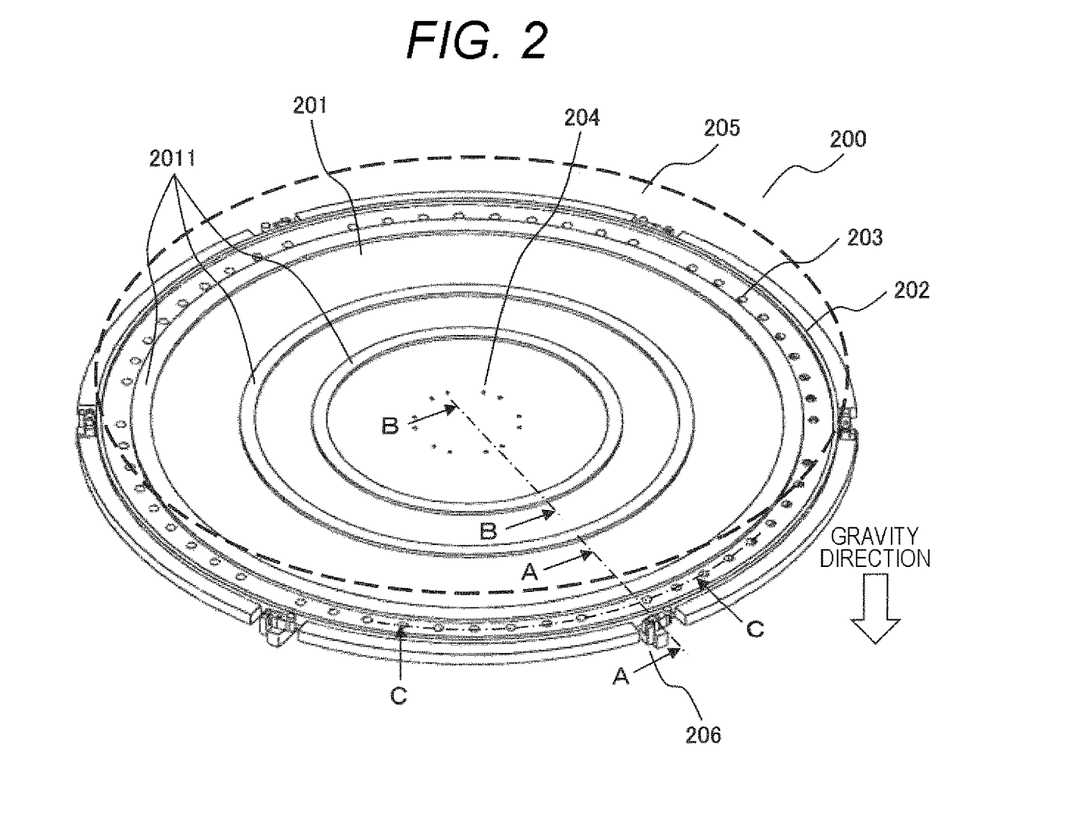
FIG. 2 is a perspective view illustrating a turntable.

FIG. 2 is a perspective view illustrating the turntable 200 that rotationally drives the wafer 205, and the wafer 205 is transmitted so that the upper surface of the turntable 200 can be seen. As illustrated in FIG. 2, in the present embodiment, a back surface non-contact type wafer holding method is adopted in which the wafer 205 is held in a state of floating in the air by holding the outer peripheral side surface of the wafer 205 from the outer diameter side of the wafer 205. In such a back surface non-contact type wafer holding method, an advanced mechanism is required to secure the flatness of the wafer 205. Therefore, in the present embodiment, a clamp mechanism 206 that moves in an in-plane direction of the wafer 205 and presses the wafer 205 is adopted. In addition, in order to correct the self-weight sinking of the wafer 205, an air pressure correction structure including an air inlet 204 in the central portion, an air outlet 203 in the outer peripheral portion, and a rib 2011 is adopted. Details of each structure will be described below.

Figure 3A:
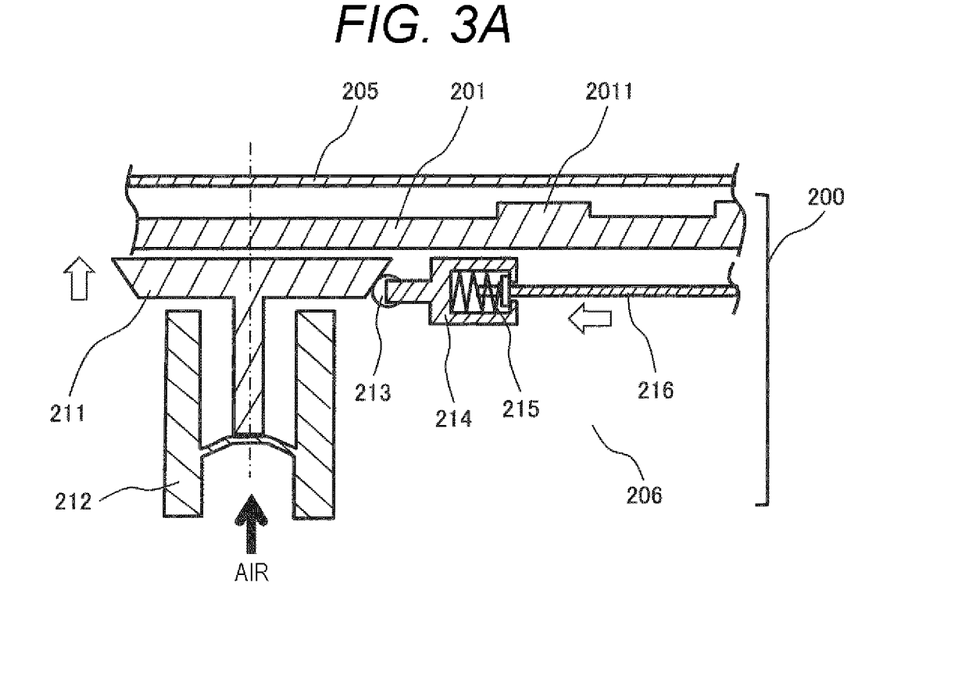
FIG. 3A is a cross-sectional view taken along line B-B in FIG. 2, and is a view illustrating an operation before wafer mounting of a part (inner diameter side portion) of a clamp mechanism.
Figure 3B:
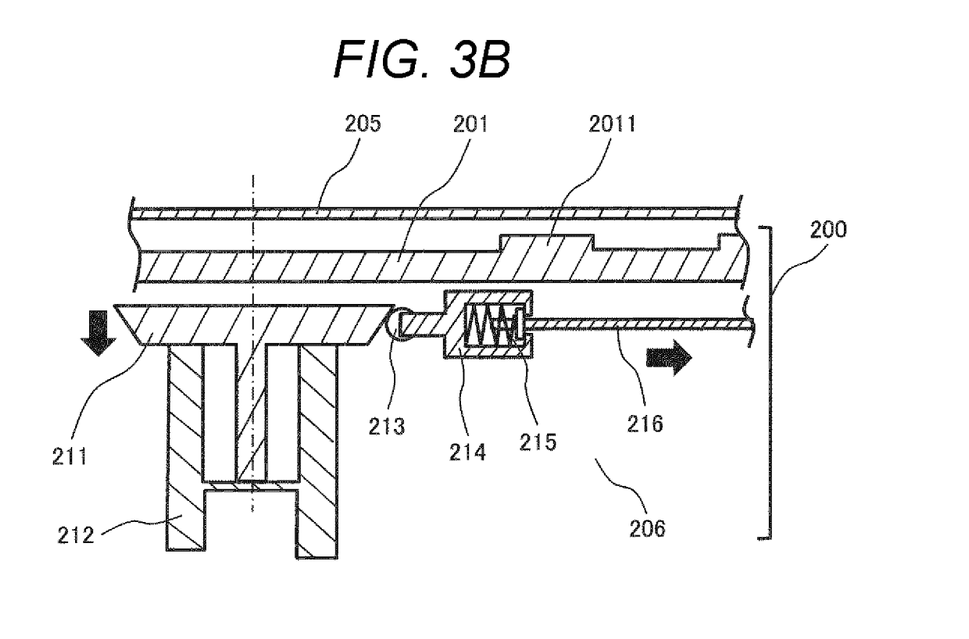
FIG. 3B is a cross-sectional view taken along line B-B in FIG. 2, and is a view illustrating an operation after wafer mounting of the part (inner diameter side portion) of the clamp mechanism.
Figure 4:
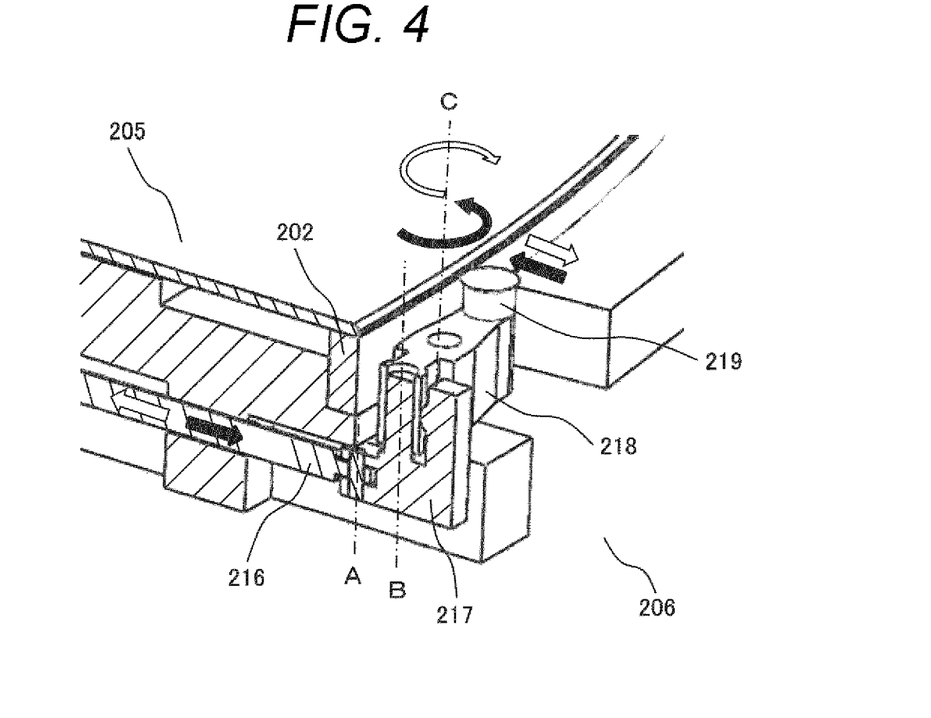
FIG. 4 is a perspective view illustrating another part (outer diameter side portion) of the clamp mechanism taken along line A-A of FIG. 2.

Details of the clamp mechanism 206 will be described with reference to FIGS. 3A to 4. FIG. 3A is a cross-sectional view taken along line B-B in FIG. 2, and is a view illustrating an operation before wafer mounting of a part (inner diameter side portion) of the clamp mechanism 206. FIG. 3B is a cross-sectional view taken along line B-B in FIG. 2, and is a view illustrating an operation after wafer mounting of the part (inner diameter side portion) of the clamp mechanism. FIG. 4 is a perspective view illustrating another part (outer diameter side portion) of the clamp mechanism taken along line A-A of FIG. 2. Note that a direction of each of arrows in black and white illustrated in FIG. 4 indicates a moving direction of each element, and corresponds to the moving direction of each element by the movement of each arrow in FIGS. 3A and 3B. The clamp mechanism 206 of the present embodiment includes an air cylinder 212, a cam 211, a bearing 213, a bearing mounting portion 214, a rod 216, a compression spring 215, and a link 217 and a holding member 218 illustrated in FIG. 4. The air cylinder 212 is mounted on a central portion of a turntable base 201 which is a base of the turntable 200 and moves up and down. The cam 211 is attached to the air cylinder 212. The bearing 213 comes into contact with the cam 211 and converts the movement of the cam 211 in the axial direction (vertical direction) into the radial direction. The bearing 213 is mounted to the bearing mounting portion 214. The rod 216 moves relative to the bearing mounting portion 214 in the radial direction. The compression spring 215 radially supports the bearing mounting portion 214 and the rod 216. The link 217 is connected to an outer diameter end of the rod 216 so as to be rotatable about a vertical axis A. The holding member 218 is joined to a vertical axis B of the link 217 and is rotatable about a vertical axis C.

A pressing portion 219 is attached to the holding member 218 on a side opposite to the vertical axis B with the vertical axis C interposed therebetween. When the holding member 218 rotates about a rotational axis (vertical axis C) in the out-of-plane direction of the wafer 205, the pressing portion 219 moves in the in-plane direction and contacts or separates from the outer peripheral side surface of the wafer 205.

Further, in the clamp mechanism 206, a plurality of elements excluding the air cylinder 212 and the cam 211 are arranged in the circumferential direction of the turntable 200. The number and the place of arrangement are not limited to six as illustrated in FIG. 2, and other numbers and places may be used as long as the total sum of vectors of pressing forces from the pressing portions 219 is 0.

Next, the operation of the clamp mechanism 206 will be described. After the wafer 205 is brought into the inspection chamber 13 by the wafer conveyance mechanism 12, as illustrated in FIG. 3A, air is supplied to the air cylinder 212, the cam 211 moves upward, and the rod 216 moves to the inner diameter side. Then, as indicated by a white arrow in FIG. 4, the link 217 moves toward the inner diameter side following the movement of the rod 216. Here, since the pressing portion 219 is provided on the side opposite to the link 217 with respect to the rotational axis of the holding member 218, the pressing portion 219 moves to the opposite side to the movement of the link 217, that is, to the outer diameter side. As a result, since the pressing portion 219 separates from the position of the outer peripheral side surface of the wafer 205, the turntable 200 is ready to receive the wafer 205. Thereafter, the wafer conveyance mechanism 12 places the wafer 205 on the ring-shaped wafer support portion 202 formed on the upper surface on the outer diameter side of the turntable 200.

Then, after the wafer conveyance mechanism 12 is retracted, as illustrated in FIG. 3B, the clamp mechanism 206 stops the air supply to the air cylinder 212, and the cam 211 moves downward, so that the rod 216 moves to the outer diameter side. Then, as indicated by a black arrow in FIG. 4, the link 217 moves to the outer diameter side following the movement of the rod 216. Therefore, the pressing portion 219 moves opposite to the movement of the link 217, that is, moves to the inner diameter side. As a result, the pressing portion 219 contacts the outer peripheral side surface of the wafer 205 and generates a holding force in the in-plane direction.

Here, when the cam 211 moves downward, as indicated by a black arrow in FIG. 3B, the bearing 213, the bearing mounting portion 214, the compression spring 215, and the rod 216 integrally move to the outer diameter side until the pressing portion 219 comes into contact with the wafer 205. When the pressing portion 219 contacts the wafer 205, the rod 216 stops moving, but the bearing mounting portion 214 continues to move to the outer diameter side until the movement of the cam 211 is completed. At this time, as the relative distance between the bearing mounting portion 214 and the rod 216 approaches, the compression spring 215 contracts. The spring force of the compression spring 215 is transmitted to the pressing portion 219 and becomes the holding force in the in-plane direction of the wafer 205 by the pressing portion 219. The holding force by the pressing portion 219 is obtained by multiplying the spring force of the compression spring 215 by "ratio obtained by dividing a distance from the rotation center (vertical axis C serving as fulcrum) of the holding member 218 to the joining axis (vertical axis B serving as point of force) of the link 217 by a distance from the rotation center to the center (point of action) of the pressing portion 219".

The pressing portion 219 has a circular horizontal cross section and is detachable from the holding member 218. As a result, when the abutting surface of the pressing portion 219 with the wafer 205 is worn, the pressing portion 219 is temporarily removed, the contact surface with the wafer 205 is changed, and the pressing portion 219 is attached again, so that the pressing portion 219 can be reused, and the life can be extended. On the other hand, by integrating the holding member 218 and the pressing portion 219, making them detachable from the vertical axis C, and making them replaceable, it is possible to improve the maintainability while improving the handleability of the component.

The functions required for the clamp mechanism 206 are mainly an alignment function at the time of mounting the wafer 205, a slip prevention function at the time of rotation start-up, and a function against a centrifugal force caused by eccentricity of the wafer 205 at the time of steady rotation. The alignment function at the time of mounting the wafer 205 is covered by a static holding force, that is, a holding force generated by the compression spring 215. The slip prevention function and the function against the wafer centrifugal force are covered by the holding force in consideration of the centrifugal force generated by each element of the clamp mechanism 206. In order to obtain the necessary centrifugal force, the centrifugal force is adjusted by the shape and mass of each element such as the bearing 213, the bearing mounting portion 214, the rod 216, and the link 217.

Figure 5A:
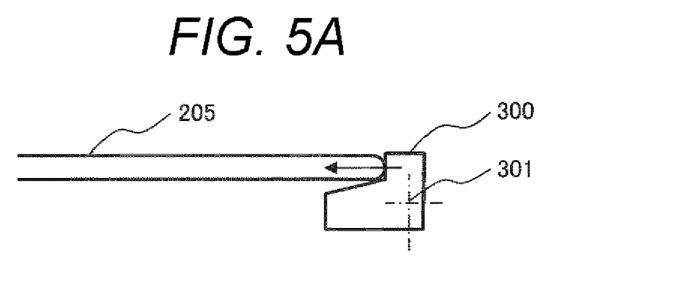
FIG. 5A is a cross-sectional view illustrating a state in which a wafer having a radius of a specified value is held by a pressing portion of a comparative example (conventional substrate inspection device).
Figure 5B:
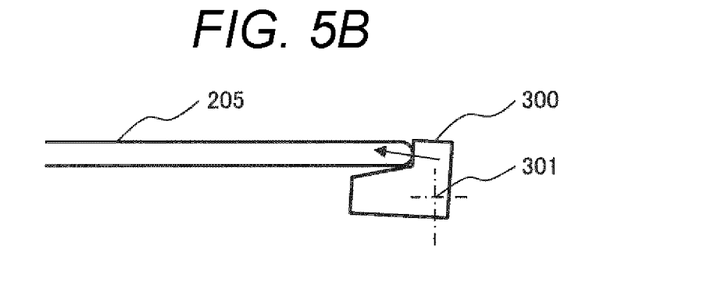
FIG. 5B is a cross-sectional view illustrating a state in which a wafer having a radius larger than a specified value is held by the pressing portion of the comparative example (conventional substrate inspection device).
Figure 5C:
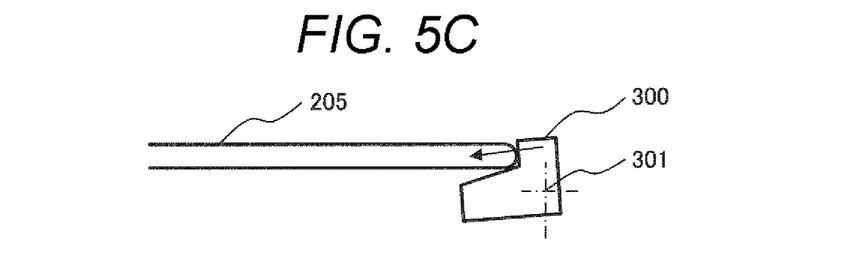
FIG. 5C is a cross-sectional view illustrating a state in which a wafer having a radius smaller than a specified value is held by the pressing portion of the comparative example (conventional substrate inspection device).

FIGS. 5A to 5C are cross-sectional views illustrating a state in which wafers 205 of various sizes are held by a pressing portion 300 of a conventional substrate inspection device (PTL 1) as a comparative example. The wafer 205 to be inspected may actually have a slight variation in size. As illustrated in FIG. 5A, when the radius of the wafer 205 is a specified value, the wafer abutting surface of the pressing portion 300 is parallel to the outer peripheral side surface of the wafer 205. However, as illustrated in FIG. 5B, when the radius of the wafer 205 is larger than the specified value, the wafer abutting surface of the pressing portion 300 is inclined to face upward. That is, a holding force in the out-of-plane direction is also applied to the wafer 205, and the wafer 205 is in a holding state of being urged to deform. Conversely, when the radius of the wafer 205 is smaller than the specified value as illustrated in FIG. 5C, the wafer abutting surface of the pressing portion 300 is inclined to face downward. That is, also in this case, a holding force in the out-of-plane direction is applied to the wafer 205, and the wafer 205 is in a holding state of being urged to deform. Therefore, in the comparative example, when the size of the wafer 205 varies, deformation of the wafer 205 occurs and the flatness decreases, which may affect highly sensitive foreign matter detection.

On the other hand, in the clamp mechanism 206 of the present embodiment described above, since the pressing portion 219 moves in the in-plane direction and the direction of holding the wafer 205 does not change, even if the radius of the wafer 205 varies, the deformation of the wafer 205 can be suppressed. In addition, when the wafer 205 is rotated, a centrifugal force is also generated in each element of the clamp mechanism 206, but since the centrifugal force acts in a direction of increasing the holding force in the in-plane direction, the holding of the wafer 205 is stabilized. In addition, since the wafer 205 is held on the turntable 200 by a fluid force to be described later, the holding in the out-of-plane direction is stabilized even when the wafer 205 is rotated. As a result, since the rotation stabilization of the wafer 205 can be achieved while suppressing the deformation of the wafer 205, it is possible to realize the wafer inspection device 10 with high reliability in which the high-sensitivity detection of the foreign matter is improved.

Figure 6:
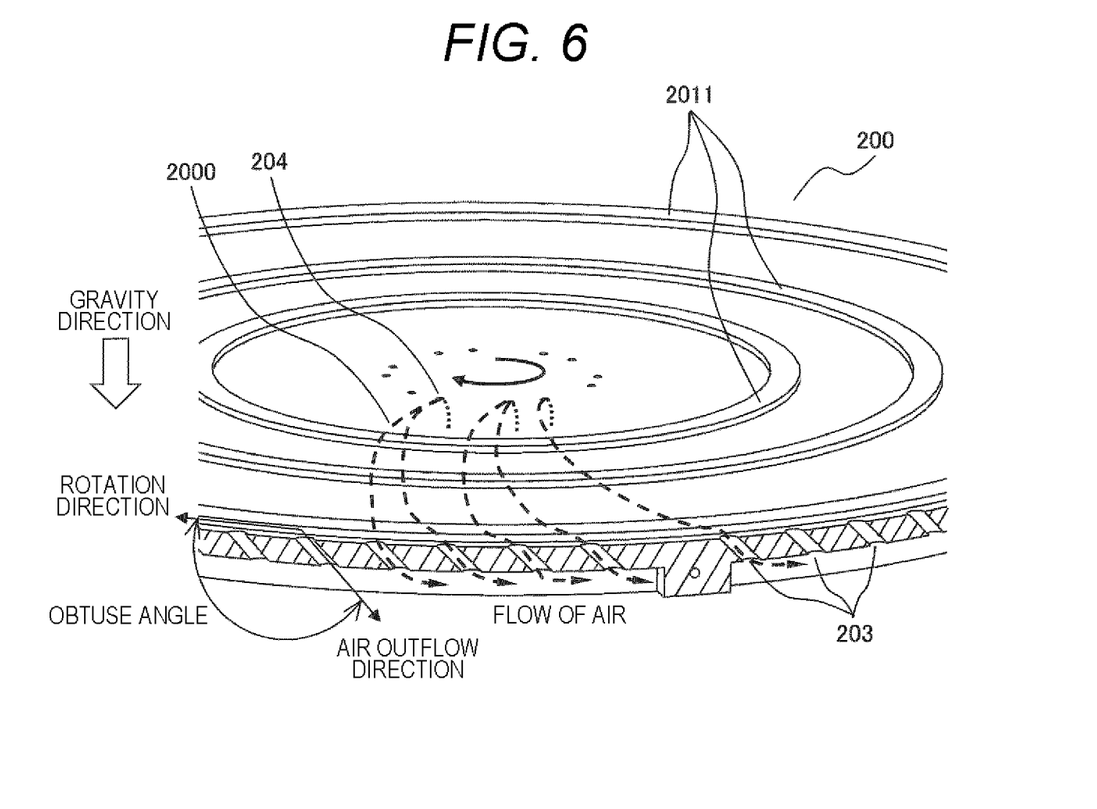
FIG. 6 is a perspective view illustrating a flow of air taken along line C-C of FIG. 2.

FIG. 6 is a view illustrating a structure for correcting the self-weight sinking of the wafer 205, and is a cross-sectional view taken along line C-C in FIG. 2. A method of correcting the self-weight sinking of the wafer 205 will be described in detail. There is a possibility that the vicinity of the center of the wafer 205 sinks due to the influence of gravity to generate a recess. In order to prevent such self-weight sinking, in the present embodiment, air is discharged to the lower surface in the vicinity of the center of the wafer 205. Specifically, air is supplied from a plurality of air inlets 204 formed in the vicinity of the center of the turntable base 201 to a space between the wafer 205 and the turntable base 201, and the wafer 205 is corrected to be flat by the generated air pressure. The supplied air is discharged to the outside from a plurality of air outlets 203 formed on the outer diameter side of the turntable base 201.

Annular convex portions (ribs 2011) close to the wafer 205 are formed on the inner diameter side of the air outlets 203 on the upper surface of the turntable base 201. By controlling the pressure applied to the wafer 205 by adjusting the number, height, width, and the like of the ribs 2011, it is possible to contribute to the flattening of the wafer 205.

Figure 7:
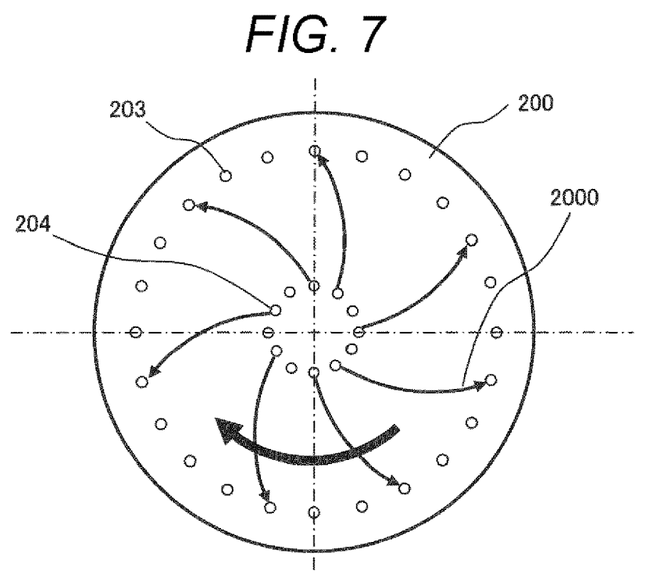
FIG. 7 is a diagram illustrating a flow of air on the turntable.

FIG. 7 is a diagram illustrating a flow of air on the turntable 200. As illustrated in FIG. 6, the supplied air is delayed with respect to the rotation of the turntable 200 while receiving the rotational inertia force, and draws a spiral path 2000 and moves to the outer diameter side. The air having moved to the outer diameter side is guided to the air outlets 203 at the portion and discharged to the outside. The air before being discharged to the outside is almost integrally rotated although the rotation of the turntable 200 is delayed. Therefore, the air immediately before being discharged from the air outlets 203 is discharged to the external stationary space at the rotation speed of the turntable 200, and thus, a speed difference from the outside occurs.

Figure 8:
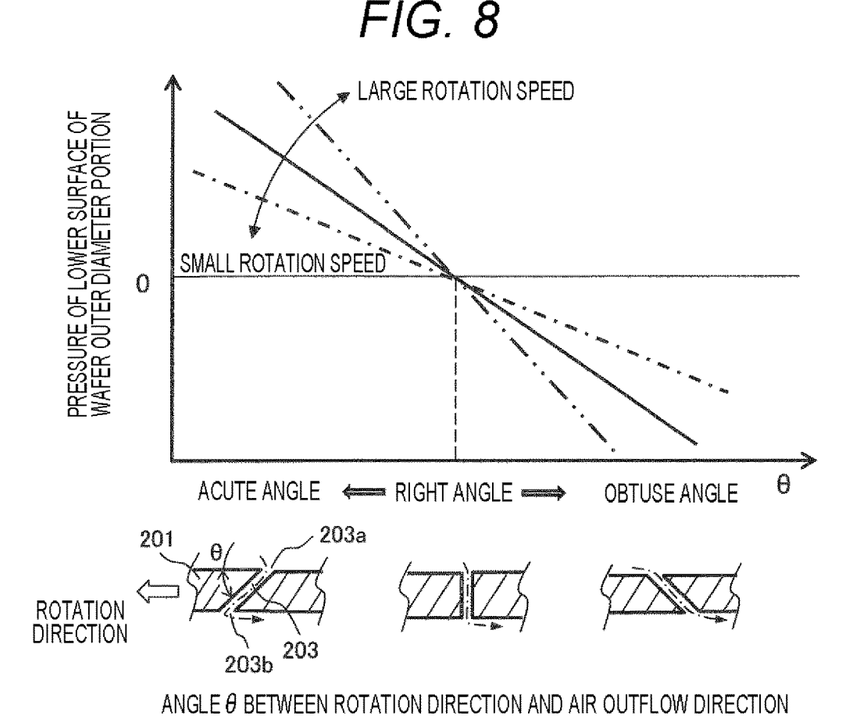
FIG. 8 is a graph showing the relationship between the angle of the air outlet and the pressure of the lower surface of the wafer outer diameter portion.

FIG. 8 is a graph illustrating a pressure state of the lower surface of the outer diameter portion of the wafer 205 when the angle of the air outlet 203 is changed. Note that, below the horizontal axis in FIG. 8, a cross-sectional view is also shown so that the position of the upper end 203a serving as an air inlet to the air outlet 203 and the position of the lower end 203b serving as an air outlet from the air outlet 203 can be seen. On the left side of the horizontal axis, since the upper end 203a is at a position retracted from the lower end 203b with respect to the rotation direction of the turntable 200, the angle θ formed by the rotation direction and the air outflow direction (one-dot chain line) is an acute angle. At the center of the horizontal axis, since the air outlet 203 is formed of a hole penetrating in the vertical direction, the angle θ is a right angle. On the right side of the horizontal axis, since the upper end 203a is at a position preceding the lower end 203b with respect to the rotation direction of the turntable 200, the angle θ is an obtuse angle.

As illustrated in FIG. 8, the pressure on the lower surface of the outer diameter portion of the wafer 205 varies depending on the shape of the air outlet 203. For example, when the shape of the air outlet 203 simply penetrates in the vertical direction, neither negative pressure nor positive pressure is generated with respect to the wafer 205. When the angle θ between the rotation direction and the air outflow direction is an acute angle, an action of introducing external air is applied to the air outlet 203, so that a positive pressure, that is, a force of lifting the wafer 205 acts on the wafer 205. On the other hand, when the angle θ is an obtuse angle, an action of smoothly discharging air to the outside is applied to the air outlet 203, so that a negative pressure acts on the wafer 205, that is, a force acts in a direction of attracting the wafer 205 to the turntable 200. In addition, the rotation speed of the turntable 200 affects a change rate of the negative pressure generated in the wafer 205 with respect to the angle θ of the air outlet 203. When the rotation speed is large, the change rate is large, and when the rotation speed is small, the change rate is small.

Figure 9:
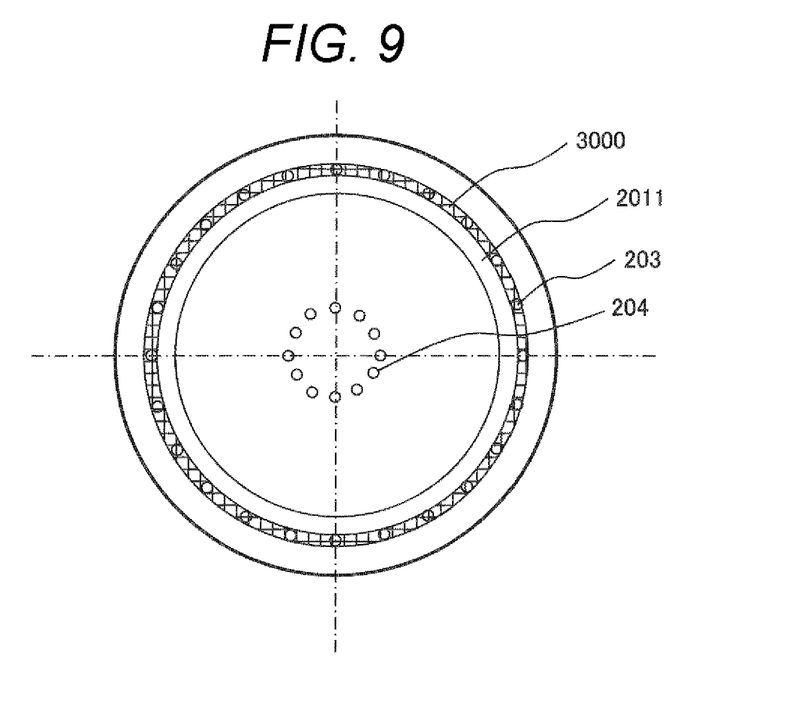
FIG. 9 is a diagram showing a negative pressure generating location on the turntable.

Since it is important that the wafer 205 is stably held on the turntable 200, the angle θ of the air outlet 203 needs to be an obtuse angle. FIG. 9 illustrates a negative pressure distribution acting on the wafer 205 when the angle θ of the air outlet 203 is an obtuse angle. By the above-described action, as indicated by hatching, a negative pressure region 3000 is formed in the vicinity of the air outlet 203. By adjusting the negative pressure in the negative pressure region 3000 to a predetermined magnitude, the holding force margin of the wafer 205 can be increased. Furthermore, deformation at the outermost periphery can be suppressed to contribute to flattening.

Therefore, in the present embodiment, as illustrated in FIG. 6, the shape of the air outlet 203 is set such that the angle θ is an obtuse angle, that is, the upper end 203a is set at a position preceding the lower end 203b, so that the wafer 205 is pulled toward the turntable 200. In the present embodiment, as illustrated in FIG. 2, the cylindrical air outlets 203 are arranged at equal intervals in the circumferential direction. However, in consideration of the magnitude of the effect and the processability, an arrangement in which the air outlets 203 are partially concentrated or a shape other than a cylinder such as a rectangle can be appropriately used.

In the present embodiment, since the annular rib 2011 is formed on the turntable 200, free movement of air in the radial direction is hindered. Therefore, the air speed in the radial direction of the turntable 200 is sufficiently smaller than the air speed in the circumferential direction of the turntable 200. Therefore, the upper end 203a and the lower end 203b of the air outlet 203 are formed to have the same distance from the center of the turntable 200. However, in consideration of the flow of air toward the outside in the radial direction, the air outlet 203 may be formed such that the lower end 203b is on the outer diameter side with respect to the upper end 203a.

Second Embodiment

Figure 10:
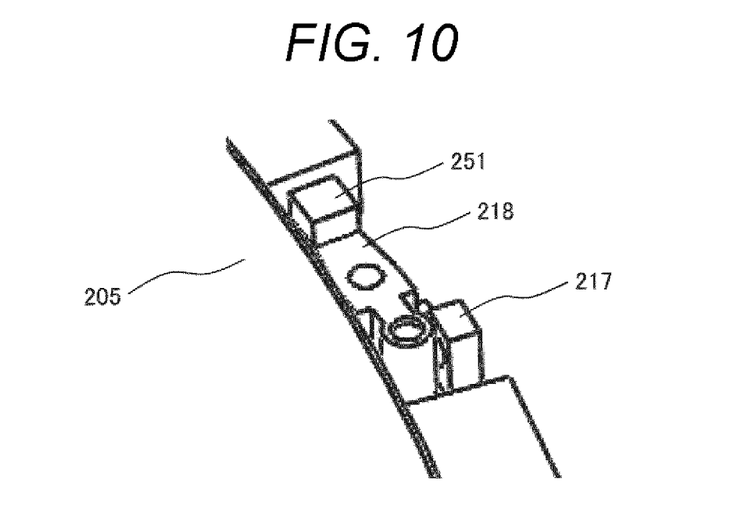
FIG. 10 is a perspective view showing the vicinity of a pressing portion of a second embodiment.

Next, a second embodiment of the present invention will be described with reference to FIG. 10. FIG. 10 is a perspective view illustrating the vicinity of a pressing portion 251 of the present embodiment. The present embodiment is different from the first embodiment in that the shape of the pressing portion holding the wafer outer peripheral side surface is rectangular. Here, the flat surface portion of the rectangular pressing portion 251 serving as the wafer abutting surface is parallel to the outer peripheral side surface of the wafer. Since the pressing portion 251 of the present embodiment has a rectangular shape, processing is simple, and the manufacturing unit price can be kept low.

Third Embodiment

Figure 11:
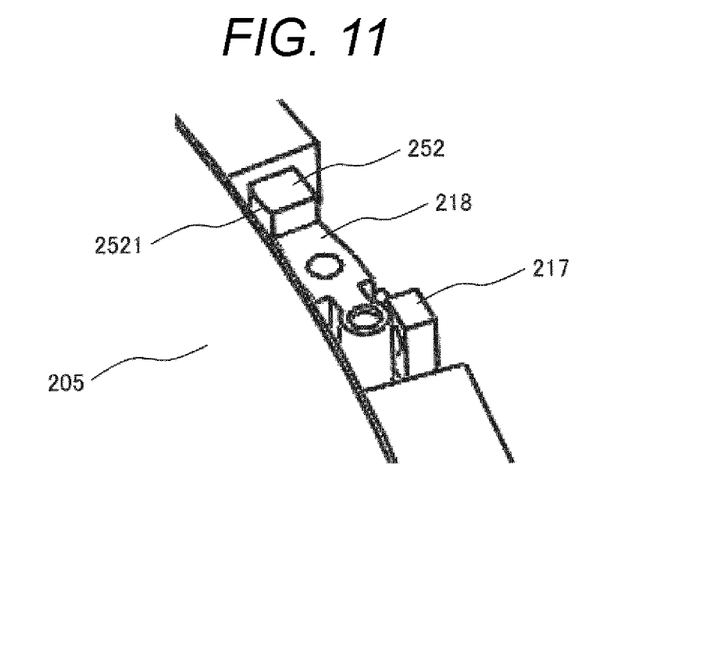
FIG. 11 is a perspective view showing the vicinity of a pressing portion of a third embodiment.
Figure 12:
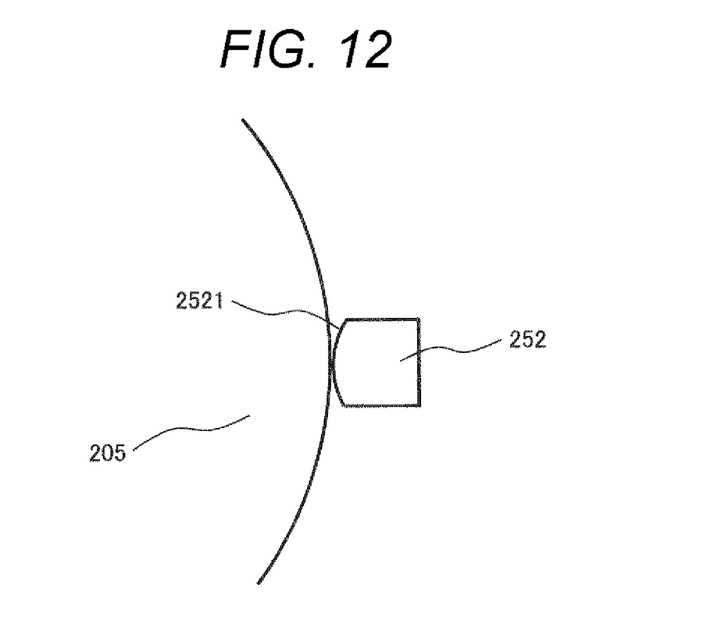
FIG. 12 is a top view illustrating a conceptual shape of a pressing portion of the third embodiment.

Next, a third embodiment of the present invention will be described with reference to FIGS. 11 and 12. FIG. 11 is a perspective view illustrating the vicinity of a pressing portion 252 of the present embodiment, and FIG. 12 is a top view illustrating a conceptual shape of the pressing portion 252 of the present embodiment. The present embodiment is different from the first embodiment in that the curved surface of the wafer abutting surface of the pressing portion is enlarged to be close to the size of the curved surface of the wafer 205. Specifically, the curvature of a wafer abutting surface 2521 of the pressing portion 252 is 80% or more and 120% or less of the curvature of the wafer 205. As a result, a contact area between the wafer 205 and the pressing portion 252 can be increased, and an effect of dispersing stress can be obtained. As a result, since the wear speed of the pressing portion 252 can be suppressed low, the life of the clamp mechanism 206 can be extended.

In the present embodiment, 2521 which is the abutting surface with the wafer 205 is shown in a convex shape, but by having the same curvature as the wafer edge and a concave shape, there is also an effect that further stress dispersion can be expected.

Fourth Embodiment

Figure 13:
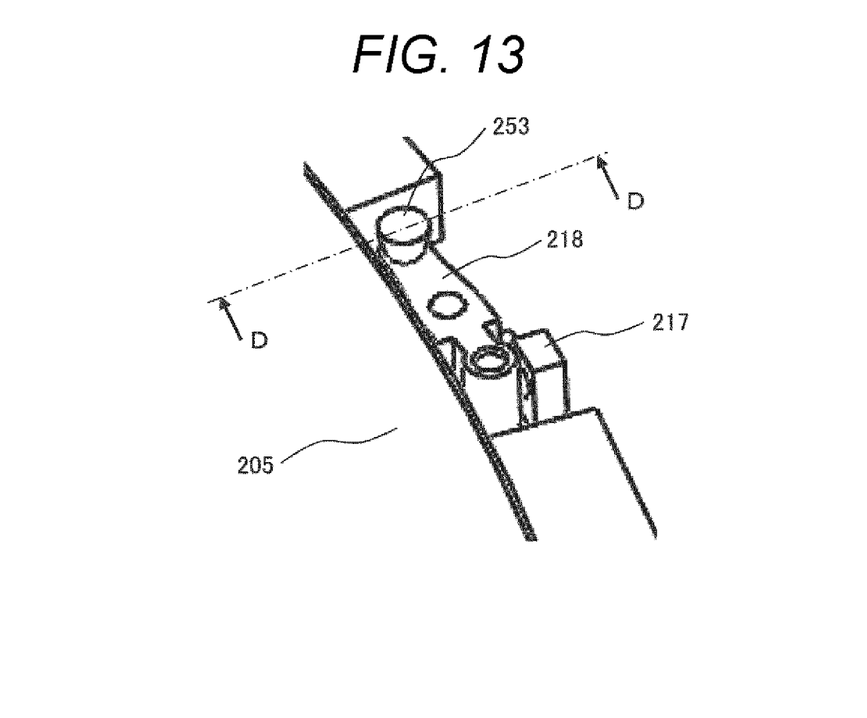
FIG. 13 is a perspective view showing the vicinity of a pressing portion of a fourth embodiment.
Figure 14:
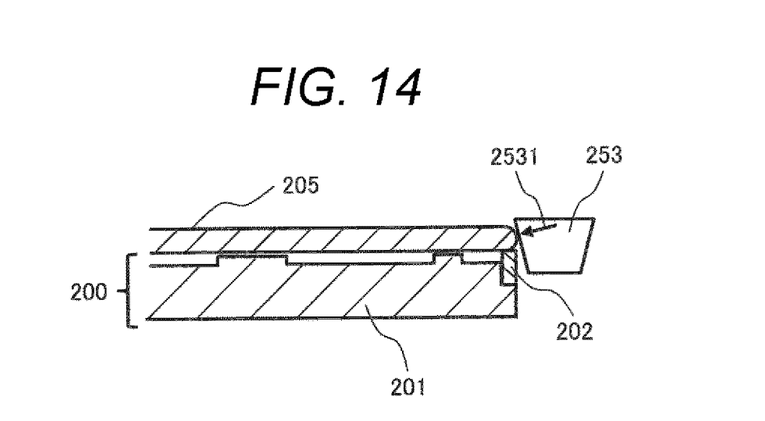
FIG. 14 is a cross-sectional view taken along line D-D in FIG. 13.

Next, a fourth embodiment of the present invention will be described with reference to FIGS. 13 and 14. FIG. 13 is a perspective view illustrating the vicinity of a pressing portion 253 of the present embodiment, and FIG. 14 is a cross-sectional view taken along line D-D in FIG. 13. The present embodiment is different from the first embodiment in that the pressing portion has an inverted truncated cone shape. Specifically, the horizontal cross section of the pressing portion 253 has a circular shape, and the radius of the circle is smaller in the lower portion than in the upper portion. Since the wafer abutting surface of the pressing portion 253 of the present embodiment is inclined to face downward, a holding force in a direction in which the wafer 205 is pressed toward the turntable 200 as indicated by an arrow 2531 in FIG. 14 is generated. As a result, since a holding force in the wafer out-of-plane direction is applied, reliability of wafer holding can be improved. However, the deformation of the pressing portion 253 due to the holding force in the out-of-plane direction needs to be kept within a range that does not impair the measurement sensitivity of the foreign matter.

Note that, although the shapes of the pressing portions in all the embodiments are described in the shape of a rotating body, it is also possible to achieve the object and effect by forming only the abutting surface with the wafer into a desired shape.

The above-described first to fourth embodiments have been described in detail in order to describe the present invention in an easy-to-understand manner, and is not necessarily limited to one including all the described configurations. Further, a part of the configuration of one embodiment can be replaced with the configuration of another embodiment, and the configuration of one embodiment can be added to the configuration of another embodiment. Further, other components may be added to, deleted from, or substituted for a part of the configuration of each embodiment.

REFERENCE SIGNS LIST 10 wafer inspection device
11 wafer introduction portion
12 wafer conveyance mechanism
13 inspection chamber
131 optical measurement portion
132 motor
133 linear moving unit
200 turntable
201 turntable base
202 wafer supporting part
203 air outlet
204 air inlet
205 wafer
206 clamp mechanism
211 cam
212 air cylinder
213 bearing
214 bearing mounting portion
215 compression spring
216 rod
217 link
218 holding member
219 pressing portion (first embodiment)
251 pressing portion (second embodiment)
252 pressing portion (third embodiment)
253 pressing portion (fourth embodiment)
300 pressing portion (comparative example)
2011 rib

The invention claimed is:
1. A substrate inspection device comprising:
a turntable on which a substrate to be inspected is mounted; and
a clamp mechanism to hold the substrate on the turntable,
wherein
the clamp mechanism includes an abutting part that moves in an in-plane direction of the substrate and that presses the substrate,
wherein
the turntable is configured to be approximately the same size as the substrate, and
the clamp mechanism is located on an outer periphery of the turntable and is configured to suppress deformation of the substrate.
2. The substrate inspection device according to claim 1, wherein the abutting part contacts or separates from an outer peripheral side surface of the substrate by rotating about rotational axis in an out-of-plane direction of the substrate.
3. The substrate inspection device according to claim 1, wherein the abutting part has a curved surface, and a curvature of the abutting part at a portion in contact with the substrate is 80% or more and 120% or less of a curvature of the substrate.
4. The substrate inspection device according to claim 1, wherein a horizontal cross section of the abutting part has a circular shape, and a radius of the circle is smaller in a lower portion than in an upper portion.
5. The substrate inspection device according to claim 1, wherein an annular convex portion is formed on an upper surface of the turntable.
6. A substrate inspection device comprising:
a turntable on which a substrate to be inspected is mounted; and
a clamp mechanism to hold the substrate on the turntable,
wherein
the clamp mechanism includes an abutting part that moves in an in-plane direction of the substrate and that presses the substrate,
wherein
the turntable is configured to be approximately the same size as the substrate,
the clamp mechanism is located on an outer periphery of the turntable; and
wherein
the turntable includes an air inlet formed on an inner diameter side and an air outlet formed on an outer diameter side, and
the air outlet has an upper end set at a position preceding a lower end in a rotation direction of the turntable.

* * * * *